(No Model.)
A. CLARK.
ROPE COUPLING.
No. 368,378. Patented Aug. 16, 1887.
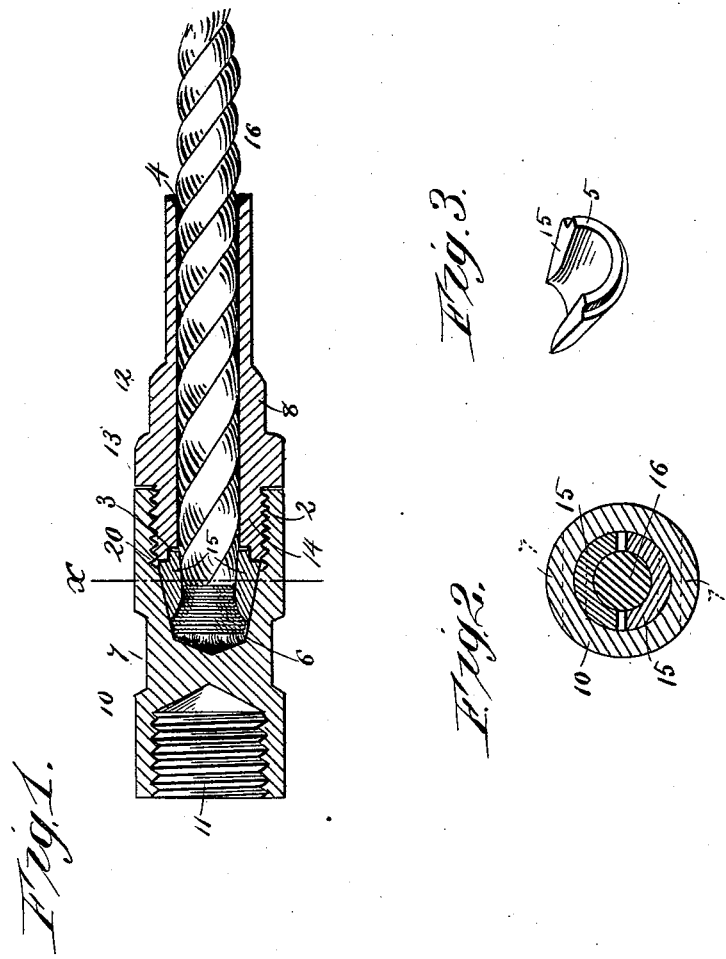
WITNESSES:
INVENTOR:
A. Clark
BY
ATTORNEYS.

UNITED STATES PATENT OFFICE.

ALFRED CLARK, OF WARREN, PENNSYLVANIA.

ROPE-COUPLING.

SPECIFICATION forming part of Letters Patent No. 368,378, dated August 16, 1887.

Application filed September 30, 1886. Serial No. 215,006. (No model.)

*To all whom it may concern:*

Be it known that I, ALFRED CLARK, of Warren, in the county of Warren and State of Pennsylvania, have invented a new and Improved Rope-Socket, of which the following is a full, clear, and exact description.

This invention relates to the construction of a cheap, durable, and efficient rope-socket, the object of the invention being to so arrange for the connection between the socket and the rope that, when desired, the rope may be readily removed from the socket without being in the least injured.

Reference is to be had to the accompanying drawings, forming a part of this specification, in which similar figures of reference indicate corresponding parts in all the views.

Figure 1 is a central sectional view of my improved form of socket. Fig. 2 is a cross-sectional view taken on the line *x x* of Fig. 1, and Fig. 3 is a perspective view of one of the concavo-convex wedge-shaped clamps.

In constructing such a socket as the one illustrated in the drawings above referred to I provide a main body or barrel, 10, one end of which is formed with a simple internally-threaded socket, 11, while the other end is formed with a socket, 20, the outer portion of which is threaded, as shown at 2, while the inner portion is in the form of the frustum of a cone.

In connection with the socket described I employ a sleeve, 12, formed with a shoulder, 13, and a threaded flange, 14, the thread on the flange being made to correspond with the thread 2 of the socket 10. The end of the flange 14 is formed with a recess, 3, and the bore of the sleeve 12 increases in size toward the outer end of the sleeve, thus forming a flaring or bell-shaped mouth, 4.

In connection with the parts described I employ two or more concavo-convex wedge-shaped pieces, 15, said pieces being formed with flanges 5, that are adapted to fit within the recess 3 of the flange 14. As many of the pieces 15 are employed as are necessary to complete a ring when all of the pieces are united.

In operation the rope 16, the end of which is preferably bound, as shown, in order that it may be thereby protected, is inserted in the bore of the sleeve 12, the end 6 of the rope being forced within the socket 20, while the pieces 15, two of which are preferably employed, are placed as shown in Figs. 1 and 2. The sleeve 12 is then advanced so that its thread will engage with the thread of the socket 20, and the sleeve is then turned until the pieces 15 are forced against the inclined walls of the inner portion of the socket 20, the flanges 5 of the pieces at this time entering the recesses 3 of the flange 14, so that any continued motion of the sleeve will cause the pieces to bind hard against the rope, thereby clamping the same to place, a proper grip upon the body of the socket and the sleeve being secured by wrenches applied at the points 7 and 8, the sleeve at the point 8 being square, hexagonal, or any other proper shape desired. In removing the rope the socket proper and the sleeve are simply disconnected, after which the rope may be easily withdrawn.

This device may be employed for many and varied uses in the mechanical arts, but is particularly adapted to securing a rope or chain to a drill, or to coupling lengths of rope together, in which case a socket, 20, would be formed at each end of the body or barrel 10.

Having thus fully described my invention, I claim as new and desire to secure by Letters Patent—

The combination, with a body or barrel, 10, formed with a socket, 20, substantially as described, of a sleeve, 12, formed with a flange, 14, having a recess, 3, and concavo-convex pieces 15, having flanges 5, substantially as described.

ALFRED CLARK.

Witnesses:
W. H. PICKETT,
JAMES W. KITCHEN.